No. 787,444. PATENTED APR. 18, 1905.
M. C. HALL.
HOISTING MECHANISM.
APPLICATION FILED NOV. 8, 1904.
2 SHEETS—SHEET 1.
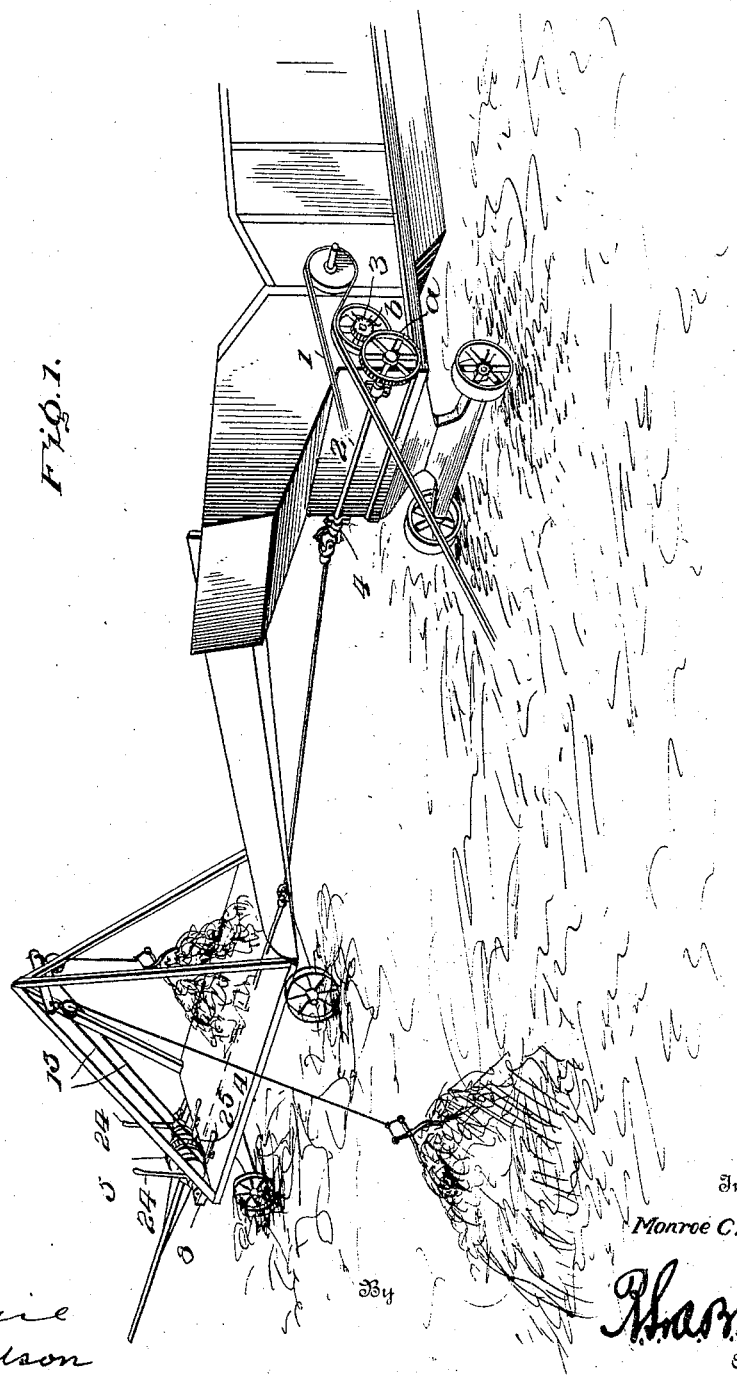
Witnesses
Inventor
Monroe C. Hall
By
Attorneys

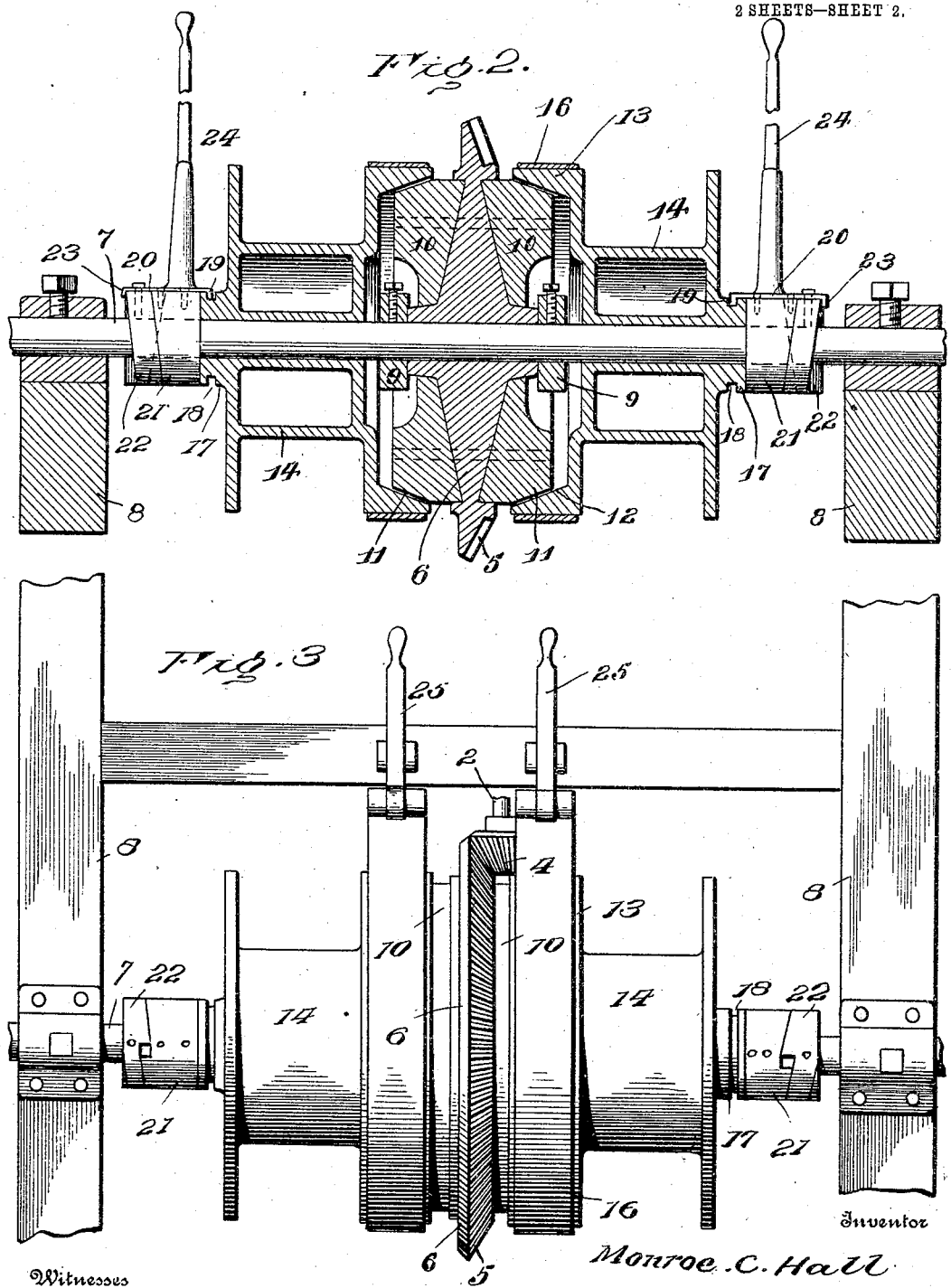

No. 787,444.                                                                 Patented April 18, 1905.

UNITED STATES PATENT OFFICE.

MONROE C. HALL, OF WINCHESTER, IDAHO.

HOISTING MECHANISM.

SPECIFICATION forming part of Letters Patent No. 787,444, dated April 18, 1905.

Application filed November 8, 1904. Serial No. 231,876.

*To all whom it may concern:*

Be it known that I, MONROE C. HALL, a citizen of the United States, residing at Winchester, in the county of Nez Perces and State of Idaho, have invented certain new and useful Improvements in Hoisting Mechanisms, of which the following is a specification.

This invention provides a novel form of actuating means for operating the hoisting-rope of a lifting-fork for supplying grain to the feeder of a threshing-machine, the purpose being to derive the operating power for said actuating means from the loose portion of the main drive-belt.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view showing the invention applied to a derrick-fork-hoisting or threshing machine. Fig. 2 is a longitudinal section of the actuating means for operating the hoisting-ropes. Fig. 3 is a top plan view of the parts shown in Fig. 2.

Corresponding and like parts are referred to in the following description and indicated in all the views of the drawings by the same reference characters.

The main drive-belt 1 for imparting motion to the threshing mechanism derives its power from a portable traction-engine (not shown) in the usual way, and its loose portion is utilized for operating the actuating means. A tumbling-shaft 2 is journaled to the threshing-machine and is provided at one end with a spur-gear *a*, which meshes with a pinion *b* on a shaft provided with a band-pulley 3 for the loose portion of the drive-belt 1 to pass over. A bevel-pinion 4 is secured to the opposite end of the tumbling-shaft 2 and meshes with beveled cog-teeth 5 of a wheel 6, loosely mounted upon a shaft 7, secured in bearings attached to timbers 8 of the derrick-wagon. Collars 9 are secured to the shaft 7 by set-screws and are arranged upon opposite sides of the wheel 6 and prevent its movement longitudinally upon the shaft 7. Wooden blocks 10 are bolted to opposite sides of the wheel 6, and their outer portions are beveled to form tapered parts 11, each adapted to coöperate with the inner tapered wall 12 of a rim or band 13, extended laterally from the inner head of a drum or windlass 14, upon which the hoisting-rope 15 is adapted to wind. The outer face of the rim or band 13 is straight and constitutes a brake member, with which a brake-band 16 coöperates to hold the drum 14 in a given position when disengaged from the wheel 6.

The wheel 6 will be designated hereinafter as the "driver," since the drums 14 when clutched thereto are driven thereby. In the preferred construction each side of the driver 6 is provided with a block 10, of wood or other fibrous material, and a drum 14 is located at each side of the driver and is mounted upon the shaft 7 to receive both a rotary and a longitudinal movement. Inasmuch as the coöperating mechanism for each drum is the same, a detailed description of one only will be given. A boss 17 projects from the outer head of the drum and is formed with an annular groove 18, which receives a lug 19 at the inner end of a bar 20, which is secured to a collar 21, loosely mounted upon the shaft 7 and confined between the drum 14 and a cam 22, secured to the shaft 7. The face of the collar 21 adjacent to the boss 17 is straight, whereas the outer face is inclined or cam shape to match the adjacent side of the cam 22, whereby a turning of the collar 21 in one direction will move the drum 14 on shaft 7 toward the driver 6 and bring the parts 13 and 10 in frictional engagement and cause the drum and driver to rotate in unison. A lug 23 is provided at the outer end of the bar 20 and engages with the outer side of the cam 22. Upon turning the collar 21 in the opposite direction the lug 23, riding upon the cam 22, effects an outward movement of the drum 14 and disengages it from the driver 6, and upon instant application of the brake 16 the drum may be held in the required position, and by proper manipulation of the brake the fork may be permitted to descend with greater or less speed. A lever 24 projects outward from the collar 21 and serves as convenient means for operating the same to effect either inward or outward movement of the drum 14. A lever 25 is connected with the brake-band 16 to tighten or loosen the same, as may be required. This lever may be conveniently located so as to be operated either by foot or hand.

The provision of two drums enables the use of two forks, and one may be elevated and the other lowered, and vice versa, thereby admitting of the action being practically continuous. By mounting the drums upon a stationary shaft 7 the wear is reduced to the smallest amount possible, thereby saving machinery, power, and lubricant.

While the invention is intended more particularly for derrick-fork hoisting, it may be employed in hoisting machinery generally where the drum is required to be thrown frequently into and out of gear or in deep-well pumping apparatus.

Having thus described the invention, what is claimed as new is—

1. In actuating mechanism for hoisting machinery, the combination of a shaft, a driver loosely mounted upon said shaft, a drum, a brake coöperating with the drum, a cam secured to the shaft, a collar arranged between said cam and drum and having positive connection with each, and a lever extended from said collar to admit of turning the latter in either direction to move the drum either toward or from said driver, substantially as set forth.

2. In actuating mechanism for hoisting machinery, the combination of a fixed shaft, a driver loosely mounted upon said shaft to turn freely thereon but prevent it from longitudinal movement, a drum mounted upon said shaft to turn and move longitudinally thereon, a clutch between said driver and drum, a cam secured to the shaft a short distance from the drum, a collar loosely mounted upon the shaft between the drum and cam, means for positively connecting said collar to the drum and cam, and means for turning the collar in either direction to effect positive movement of the drum either toward or from the driver, subtantially as set forth.

3. In combination, a stationary shaft, a driver loosely mounted thereon, set-collars secured to the shaft upon opposite sides of the driver, drums loosely mounted upon the shaft and arranged upon opposite sides of the driver, a clutch between each drum and driver, a brake for each drum, and independent means mounted upon the shaft for effecting a positive movement of each of the drums either toward or from the driver, substantially as set forth.

4. In combination, a fixed shaft, a driver loosely mounted thereon, a shaft for imparting movement to the driver and deriving power from the loose side of a drive-belt, a drum mounted upon said first-named shaft, a clutch between the drum and driver, a brake for the drum, and means for positively moving the drum toward and from the driver, substantially as set forth.

In testimony whereof I affix my signature in presence of two witnesses.

MONROE C. HALL. [L. S.]

Witnesses:
 E. C. O'NEEL,
 W. T. LOCH.